May 23, 1933.                F. S. KINGSTON                1,910,610
                         DYNAMO ELECTRIC MACHINE
                         Filed Sept. 26, 1928        2 Sheets-Sheet 1
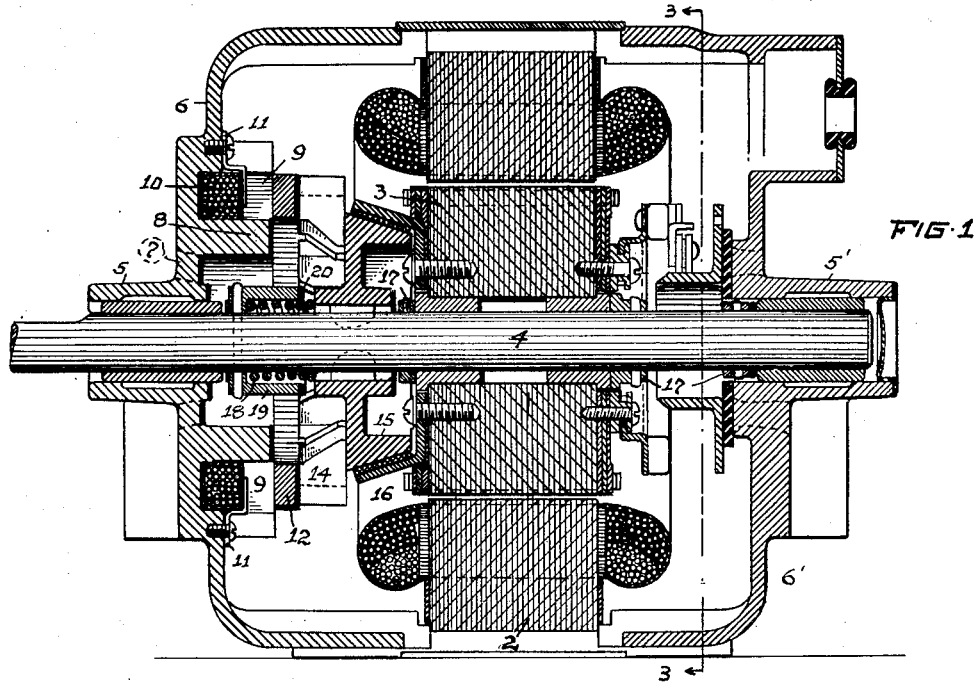
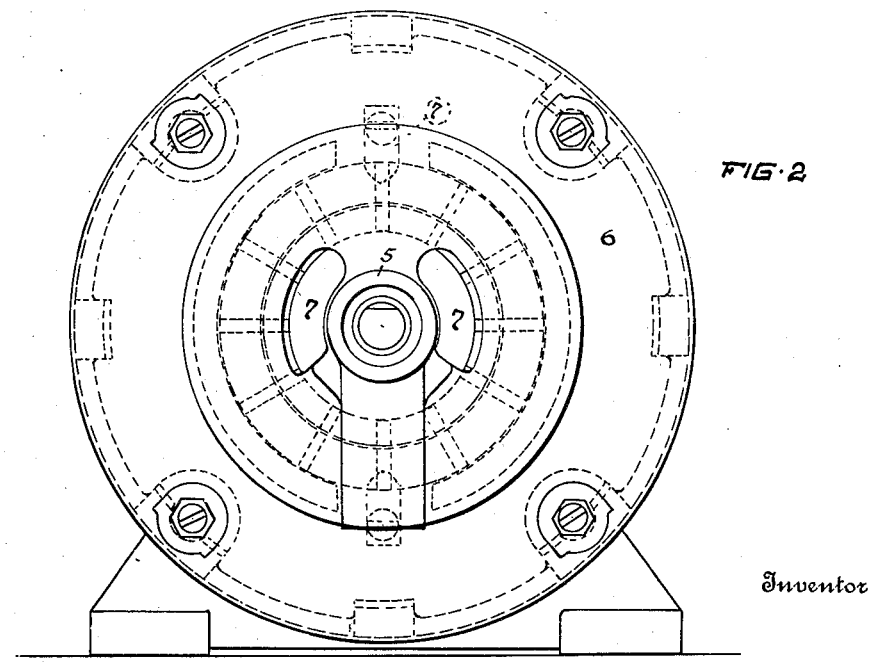
Inventor
FREDERICK S. KINGSTON
By Fisher, Moser & Moore, Attorney May 23, 1933.    F. S. KINGSTON    1,910,610
DYNAMO ELECTRIC MACHINE
Filed Sept. 26, 1928    2 Sheets-Sheet 2

Inventor
FREDERICK S. KINGSTON
By Fisher, Moser & Moore
Attorney

Patented May 23, 1933

1,910,610

UNITED STATES PATENT OFFICE

FREDERICK S. KINGSTON, OF WARREN, OHIO, ASSIGNOR TO THE SUNLIGHT ELECTRICAL MANUFACTURING COMPANY, OF WARREN, OHIO, A CORPORATION OF OHIO

DYNAMO-ELECTRIC MACHINE

Application filed September 26, 1928. Serial No. 308,383.

This invention pertains to dynamo electric machines, and more particularly to electric motors, and the invention is an improvement in the induction motor shown and described in my Letters Patent of the United States, No. 1,665,742, dated April 10, 1928. Briefly stated, my aim is to provide an induction motor which may be started speedily at a lower amperage and higher torque than induction motors in common use. To effect that purpose I utilize a spring-pressed friction clutch which maintains a driving connection normally between the rotor and power-transmitting shaft, including electrical means to disengage the clutch temporarily in starting operations. When the motor is up to speed its starting winding is cut out automatically and the driving connection with the clutch restored. In that respect the present motor is the same as my former motor, but I find that further improved results may be had by cutting out the starting winding preliminary to re-establish a clutching connection between the rotor and shaft. Thus, in starting the present motor the starting winding for the motor, and the winding for the electric clutch releasing means are energized together. Throwing out of the clutch permits the rotor to come up to speed rapidly because the rotor turns freely on the shaft, and the high speed of the rotor is then utilized to throw out separate centrifugal switches successively. In action one switch first de-energizes the starting winding for the motor, and the other switch then comes into play to de-energize the throwout coil for the clutch. The successive switching actions occur quickly but when the clutch coil is de-energized and the clutch thrown in the motor is running on its main winding at high speed. Thereafter should the motor be overloaded the separate switches will close successively in reverse order, thereby throwing out the clutch before switching in the starting winding for the motor. As a result the starting winding is not endangered and cannot burn out, and only a small amount of electric current is required in starting operations.

Figure 3:
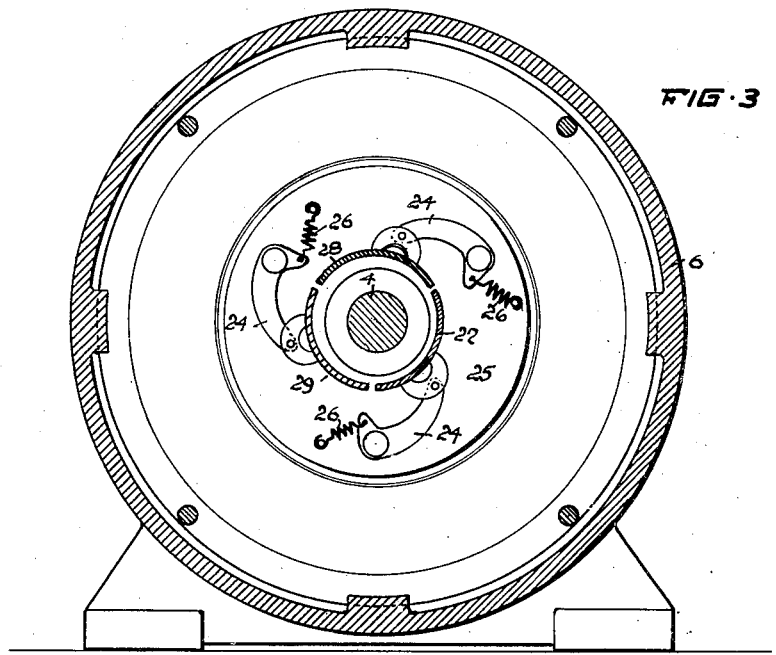
Figure 4:
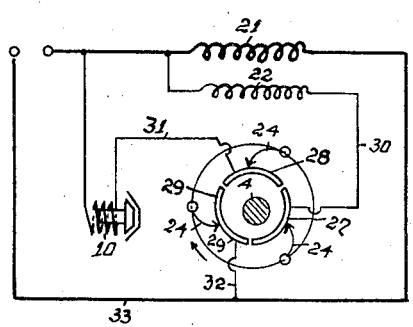
Figure 5:
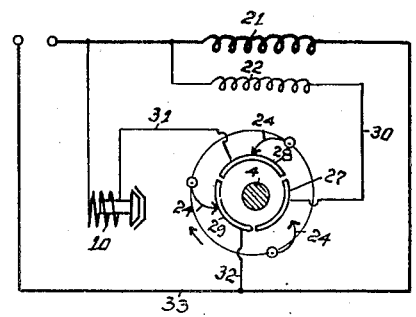
Figure 6:
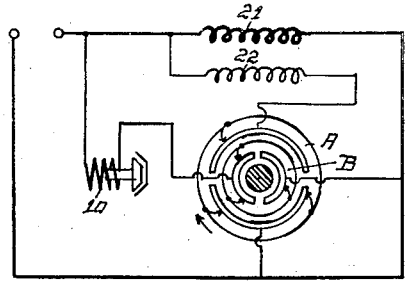

In the accompanying drawings, Fig. 1 is a sectional view of a motor embodying my improvement, and Fig. 2 is an end elevation thereof. Fig. 3 is a vertical section transversely of the motor on line 3—3 of Fig. 1. Figs. 4 and 5 are diagrams of the present motor circuit, showing one set of centrifugal switches, and Fig. 6 is a diagram of a modified form of motor circuit, showing two sets of centrifugal switches.

Structurally considered the motor comprises a stator 2 within which a rotor 3 is mounted to rotate freely on a power-transmitting shaft 4. Bearings 5—5' in separate end sections or hoods 6—6' support shaft 4 for independent rotation, and arcuate ventilation openings 7 are formed in hood 6 adjacent its bearing portion 5. Encircling this portion of the hood is a ring-shaped extension or hub 8 made of cast iron or paramagnetic material containing an annular channel 9 at its inner side wherein a magnet coil 10 is confined and held by clips 11. The coil is seated deeply within the channel to provide an annular groove or pocket wherein a ring armature 12 may move freely. In action the armature floats or remains apart from the coil and the enclosing walls of the channel. Radial ribs or vanes 14 connect armature 12 with one side of a clutch cone 15, and a dished clutch member 16 which is lined with cork, leather or other suitable material, is secured rigidly to one side of rotor 3 where it may be engaged frictionally by clutch cone 15. Thrust collars 17 on shaft 4 prevent rotor 3 from shifting on the shaft when the clutch cone is thrown in and out of engagement with the dished member. Cone member 15 is keyed slidably to shaft 4, and normally the two clutch members are held in driving connection with each other by a coiled spring 18 which is sleeved on shaft 4 with one end bearing against the hub of cone 15 and its opposite end confined within an end recess in a collar 19 pinned to shaft 4. A felt or leather washer 20 is interposed between collar 19 and the cone to eliminate noise should rubbing contact occur, but the movement of the cone outwardly is also limited by the magnetic influences on armature 12 when drawn into pocket 9, that is, armature 12 may move or float freely in annular channel 9 and hub 8, inasmuch as coil 10 is so mounted that its exposed side is remotely located from the entrance of the channel, and when armature 12 is drawn into the zone of greatest magnetic force of the magnet there is no danger of its touching or coming into frictional engagement with the coil. A floating action of the armature is desirable on account of the periodically changing force of the magnetic field due to the alternating current creating such magnetic field. The said periodic changes of the magnetic field induce periodic vibrations of the armature, which while not dangerous, create a non-desirable humming noise in the motor. To avoid such noise and counteract such vibrations of the armature the vibratory structure, consisting of the armature and spring 18, is tuned to a natural frequency different from the cycle of the current used for driving the motor, which tuning is accomplished by proportional balance of the mass of the armature and the elasticity of the spring.

As an exemplification of a field unit having a plurality of windings the stator may be wound as customarily with a running winding 21 and a starting winding 22. The rotor or armature 3 may be of the squirrel cage or any other approved type. Thus, the invention may be embodied in a split phase motor where one phase is connected directly across the line and another phase is connected with a centrifugal switch and a re-actance device, condenser or other phase-displacing means. The clutch coil 10 in my present device is connected as in my former device with the starting winding and centrifugal switch and serves as a re-actance to effect the required time displacement of the current in starting. The present motor differs however from my former motor in that the starting winding and clutch coil or winding are connected in parallel with a centrifugal switch which is particularly constructed to cut off said windings successively when the motor is up to speed.

Thus, first referring to Figs. 3 to 5, of the drawings, the switch delineated therein resembles closely one form of centrifugal switch commonly employed where a series of centrifugal switch elements 24 are pivotally mounted upon a ring 25 secured to rotor 3 and held by springs 26 in rubbing contact with a split cup. A circular cup made in three sections or parts 27, 28 and 29, is preferably employed in the present motor and the switch mechanism is further distinguished from others known to me in that this split cup is mounted eccentrically to the motor axis or shaft 4, thereby placing one of the segmental sections or parts relatively nearer the axis than the other two. The nearest section or part 27 is electrically connected to the starting winding 22 by a conductor 30, see Figs. 4 and 5. The more remote sections or parts 28 and 29 are connected by separate conductors 31 and 32 to the clutch coil 10 and one side of line 33, respectively. The arrangement described is of simple construction and functions to cut out or de-energize the starting winding 22 in advance of or prior to cutting out or de-energizing the clutch coil 10 when the motor comes up to speed. Until a high speed is attained all three centrifugal switch elements 24 rotate successively in contact with all three cup parts. Then each pivoted element 24 is acted upon centrifugally to travel in an orbit which will break contact with the innermost cup part 27 and continue to contact with the other two cup parts 28 and 29 located more remotely from the axis. This switches the starting winding 22 off while the clutch coil 10 remains in circuit and still holds the clutch members disengaged to permit the free running rotor to come up to speed without load. The main winding 21 is connected directly across the line and when the starter winding is cut out the speed of the rotor is accelerated until all three centrifugal switch elements are thrown out to their maximum and travel in an orbit clear and free of contact with all three cup parts. In that final throw-out movement the clutch coil 10 is cut-off from current and coiled spring 18 throws the clutch in to connect the shaft to the rapidly revolving rotor with a maximum starting torque for the load. Should the motor become overloaded or the rotor reduce its speed materially the clutch coil circuit is then first switched in, which results in throwing out the clutch and disconnecting the rotor from the shaft and load. The rotor being free it will come up to speed again and may repeat the action until the motor is no longer overloaded or is stopped, but the starting winding cannot come back into circuit so long as the clutch is caused to disengage itself as stated and the rotor speed does not drop low enough to bring about contact of one of the centrifugal elements with the cup segment 27 nearest the axis.

An alternative way of accomplishing the same result with a greater number of working parts is exemplified in Fig. 6, where two centrifugal switches A and B are concentrically arranged, one set being located farther from the motor axis than the other to cause that set to throw-out in advance of the other set and thereby cut out the starting winding preliminary to switching off the clutch coil. Two separate switch cups of the same diameter could also be used with two sets of centrifugal switch elements operating at different weights or spring tensions, whereby the separate starting winding and clutch coil circuits would be controlled successively in the way herein described.

The specific means for actuating the clutch and modifications thereof are claimed in Patents Nos. 1,853,864 and 1,853,865 that issued April 12, 1932 and that were co-pending herewith, and the specific armature structure for the clutch unit is set forth and claimed in my co-pending application Serial No. 603,809 that was filed April 7, 1932.

What I claim is:

1. An electric motor, including a starting device, a rotor, a driven member, a normally engaged clutch for said rotor and member, an electro-magnet for throwing out said clutch, and means controlled by said rotor for rendering said starting device inactive and subsequently rendering the electromagnet inactive when the rotor is running rapidly.

2. An electric motor, including a starting circuit, a rotor, a normally engaged clutch for said rotor, an electric magnet to throw out said clutch, and automatic means governed by said rotor to switch off said starting circuit and subsequently switch off the electro-magnet in bringing the rotor up to speed.

3. An induction motor, comprising a stator having main and starting windings, a rotor and shaft, normally engaged clutch members for said rotor and shaft, a circuit containing electrical means to disengage the clutch members temporarily in starting operations, and automatic means responsive to the speed of the rotor for first switching off said starting winding and then the electrical means successively at close intervals.

4. An electric motor having a starting circuit, including a power shaft, a rotor, a clutch for said shaft and rotor, electrical means for throwing out said clutch, and means for first deenergizing the starting circuit and then deenergizing said electrical means including centrifugal switching elements carried by said rotor and a split cup cooperating with and eccentrically related to said elements and having segments electrically connected to said starting circuit and electrical throw-out means for the clutch.

5. An induction motor, comprising a rotor and shaft, clutch members coupling said rotor and shaft, a spring normally holding said member in engagement, and an electro-magnet for disengaging said clutch members, including a floating armature and spring tuned to a natural frequency different from the cycle of the current feeding the motor.

6. An electric motor comprising a rotor, a driven member, a normally engaged clutch for said rotor and driven member, an electromagnet for releasing the clutch, a running circuit, a starting circuit, a clutch operating circuit including said electromagnet, an automatic controlling means governed by said rotor during operation of the motor for opening and closing said starting circuit, for opening said clutch operating circuit subsequent to the opening of the starting circuit, and closing the clutch operating circuit prior to closing of the starting circuit.

7. An electric motor having a starting circuit and including a driven member, a mechanical clutch normally in driving connection with said member, an electric circuit containing means to throw out said clutch, a centrifugal device operated by the driven member, and having switching means for said circuits operating at different speeds of the driven member to first deenergize the starting circuit and then the clutch throwout circuit, this switching means being normally positioned to close said circuits whereby the clutch will be thrown out in starting the motor, and the starting circuit cut off preliminary to cutting off said clutch operating circuit while the motor is coming up to speed in starting.

8. An induction motor, including split-phase starting devices, a rotor, a normally engaged mechanical clutch for said rotor, electrical means to release said clutch, and centrifugal switching means operated by the rotor comprising centrifugal contact elements and an eccentrically disposed ring of contact elements coacting with the centrifugal elements, said switching means controlling the supply of current to the starting devices and clutch releasing means, contact elements of said ring being successively disengaged from said centrifugal elements to first deenergize the starting devices and then the clutch releasing means.

9. An electric motor having a rotor, a stator, a starting winding, a driven element, a clutch for said rotor and driven element, an electro-magnet to release said clutch, and centrifugal switching devices operated by the rotor which includes centrifugal contact elements rotating about a fixed axis, and a ring of contact elements coacting with the centrifugal elements, said switching devices controlling the supply of current to the starting winding and electro-magnet, said ring of contact elements being eccentrically disposed with respect to the axis of rotation of the centrifugal device whereby the contact elements of said ring are successively separated from the centrifugal contact elements to first deenergize the starting winding and then the electro-magnet.

10. An electric motor comprising a stator, a rotor, a shaft on which the rotor is mounted, a normally engaged clutch for connecting the rotor and shaft, an electro-magnet for releasing said clutch, a motor circuit including said electro-magnet, a field winding and a starting winding connected in parallel, and a centrifugal device operated by the rotor having coacting centrifugal and stationary contact elements for controlling the supply of current to the starting winding and to said electro-magnet, certain of said stationary contact elements being differentially positioned for successive separation from the centrifugal contact elements to first deenergize the starting winding and then deenergize the electro-magnet as the speed of the rotor increases.

11. An electric motor, including a split-phase circuit containing means for effecting a time phase displacement of the current in starting, a normally engaged clutch electromagnetically operated, an electric circuit for actuating said clutch and a pair of independently operated automatic switches responsive to different rotor speeds for braking said circuits at spaced intervals after starting.

In testimony whereof I affix my signature.

FREDERICK S. KINGSTON.